United States Patent
Salter et al.

(10) Patent No.: US 11,906,348 B2
(45) Date of Patent: Feb. 20, 2024

(54) LOAD-SENSING CLOSURE PANEL

(71) Applicant: Ford Global Technologies, LLC, Dearborn, MI (US)

(72) Inventors: Stuart C. Salter, White Lake, MI (US); David Brian Glickman, Southfield, MI (US); Peter Phung, Windsor (CA); Paul Kenneth Dellock, Northville, MI (US); Pietro Buttolo, Dearborn Heights, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 547 days.

(21) Appl. No.: 17/158,453

(22) Filed: Jan. 26, 2021

(65) Prior Publication Data
US 2022/0236101 A1    Jul. 28, 2022

(51) Int. Cl.
*G01G 19/12* (2006.01)
*B60J 5/10* (2006.01)
(Continued)

(52) U.S. Cl.
CPC .............. *G01G 19/12* (2013.01); *B60J 5/10* (2013.01); *G01G 23/32* (2013.01); *G01G 23/36* (2013.01); *G07C 5/008* (2013.01); *B60J 5/04* (2013.01); *B60K 35/00* (2013.01); *B60K 2370/164* (2019.05); *B60K 2370/167* (2019.05); *B60K 2370/334* (2019.05); *B60Q 5/005* (2013.01)

(58) Field of Classification Search
CPC ....... B60J 5/04; B60J 5/10; B60J 5/101; B60J 5/107; B60J 5/108; B60J 5/102; B60J 5/103; B60J 5/104; B60J 5/02; B60J 5/0493; B62D 25/087; B62D 33/03; B62D 33/0273; G01G 19/12; G01G 23/32; G01G 23/36; E05F 15/75; B60Q 5/005; B60K 35/00; B60K 2370/164; B60K 2370/168; B60K 2370/178; B60K 2370/157; B60K 2370/334; G07C 5/008
USPC .................. 296/146.8, 57.1, 51, 58; 177/136
See application file for complete search history.

(56) References Cited

U.S. PATENT DOCUMENTS 3,857,452 A * 12/1974 Hartman ............... G01L 1/2225
                                                            177/139
6,260,916 B1 * 7/2001 Hunt .................... B62D 47/003
                                                            296/183.1
(Continued)

FOREIGN PATENT DOCUMENTS

CN           113954720 A    *  1/2022
KR        20160031971 A    *  3/2016    ......... B62D 33/0273

OTHER PUBLICATIONS

Jeon et al., KR 20160031971 A, machine translation, Mar. 23, 2016 (Year: 2016).*

*Primary Examiner* — Amy R Weisberg
*Assistant Examiner* — Wenwei Zhuo
(74) *Attorney, Agent, or Firm* — Vichit Chea; Price Heneveld LLP

(57) ABSTRACT

A vehicle includes a body, an aperture defined by the body, a closure panel, and a load sensor. The closure panel is movable between an open position and a closed position. The closure panel covers at least a portion of the aperture when the closure panel is in the closed position. The load sensor is coupled to the closure panel. The load sensor senses a load that is applied to the closure panel.

20 Claims, 6 Drawing Sheets

(51) Int. Cl.
    *G01G 23/36*     (2006.01)
    *G01G 23/32*     (2006.01)
    *G07C 5/00*     (2006.01)
    *B60Q 5/00*     (2006.01)
    *B60K 35/00*     (2006.01)
    *B60J 5/04*     (2006.01)

(56) References Cited

U.S. PATENT DOCUMENTS

| | | | |
|---|---|---|---|
| 8,174,146 B2 | 5/2012 | Cheal et al. | |
| 8,798,871 B2 * | 8/2014 | Lugash | B60P 1/4471 701/49 |
| 8,838,333 B2 | 9/2014 | Cheal et al. | |
| 9,097,055 B2 | 8/2015 | Cheal et al. | |
| 9,308,802 B2 | 4/2016 | Warburton et al. | |
| 9,636,978 B2 | 5/2017 | Warburton et al. | |
| 9,676,258 B2 | 6/2017 | Warburton et al. | |
| 9,909,347 B2 | 3/2018 | Warburton et al. | |
| 10,048,113 B2 | 8/2018 | Salter et al. | |
| 10,331,964 B2 | 6/2019 | Kanagaraj et al. | |
| 10,589,700 B2 | 3/2020 | Niedert et al. | |
| 10,676,137 B2 | 6/2020 | Bollinger | |
| 2004/0200644 A1 * | 10/2004 | Paine | G01G 19/083 177/136 |
| 2010/0076673 A1 * | 3/2010 | Saloka | B60D 1/248 701/124 |
| 2013/0110495 A1 * | 5/2013 | Sherlock | B60K 35/00 704/8 |
| 2018/0195894 A1 * | 7/2018 | Salter | B60Q 5/005 |
| 2020/0109590 A1 * | 4/2020 | Okuma | E05F 15/44 |
| 2020/0247423 A1 * | 8/2020 | Almahmoud | G01G 19/12 |
| 2020/0369136 A1 * | 11/2020 | Germano | E05D 1/04 |
| 2021/0048334 A1 * | 2/2021 | Salter | B60W 40/13 |
| 2023/0100832 A1 * | 3/2023 | Sargent | B62D 33/0273 49/31 |

* cited by examiner

LOAD-SENSING CLOSURE PANEL

FIELD OF THE DISCLOSURE

The present disclosure generally relates to closure panels. More specifically, the present disclosure relates to load-sensing closure panels.

BACKGROUND OF THE INVENTION

Closure panels, such as tailgates, are often used to support the weight of users, cargo items, and the like. However, situations exist where the weight or load applied to the closure panel may exceed the weight-bearing capabilities of the closure panel. Accordingly, damage can occur to the closure panel as a result of exceeding the weight-bearing capabilities of the closure panel. Therefore, the present disclosure seeks to mitigate the chances of damage to the closure panel and provide notifications to a user as a weight-bearing capacity of the closure panel is approached.

SUMMARY OF THE INVENTION

According to a first aspect of the present invention, a vehicle includes a body, a aperture defined by the body, a first closure panel, and a load sensor. The first closure panel is movable between an open position and a closed position. The first closure panel covers at least a portion of the aperture when the first closure panel is in the closed position. The load sensor is coupled to the first closure panel. The load sensor senses a load that is applied to the first closure panel.

Embodiments of the first aspect of the invention can include any one or a combination of the following features:
- a speaker, wherein the load sensed by the load sensor is communicated to a user as an audio output from the speaker;
- a display device positioned within a portion of the body, wherein the load sensed by the load sensor is communicated to a user as a numerical output of the display device;
- a second closure panel that is movable between an open position and a closed position, wherein the second closure panel covers at least a portion of the aperture when the second closure panel is in the closed position;
- the second closure panel includes a projection-based display device and the load sensed by the load sensor is communicated to a user as a numerical output of the projection-based display device;
- the numerical output of the projection-based display device is projected onto a portion of the second closure panel;
- the first closure panel and the second closure panel cover an entirety of the aperture when the first closure panel and the second closure panel are each in the closed position;
- a controller, wherein the controller communicates a notification to a user when the load sensed by the load sensor approaches a predetermined threshold;
- the controller contacts a repair service provider when the load sensed by the load sensor exceeds the predetermined threshold;
- the load sensor is positioned within the first closure panel;
- the aperture provides access to a cargo area;
- the aperture provides access to a passenger compartment;
- the load sensed by the load sensor is communicated to a user in a default language, wherein the default language is selected within an infotainment system; and the load sensed by the load sensor is communicated to a user via an over-the-air transmission.

According to a second aspect of the present disclosure, a method of evaluating a load exposure of a closure panel of a vehicle includes the steps of determining the closure panel is in an open position; sensing a load is present on the closure panel with a load sensor; displaying a measured weight based on an output of the load sensor; determining the load is above a first predetermined threshold; and communicating to a user that the measured weight has exceeded the first predetermined threshold.

Embodiments of the second aspect of the present disclosure can include any one or a combination of the following features:
- the step of communicating to a user that the measured weight has exceeded the first predetermined threshold includes activating a speaker of the vehicle such that the speaker emits an audio output;
- the step of communicating to a user that the measured weight has exceeded the first predetermined threshold includes alternating the displayed measured weight between an on state and an off state such that the displayed measured weight flashes a plurality of times;
- the method also includes the steps of determining the load is above a second predetermined threshold; and communicating to the user that the measured weight has exceeded the second predetermined threshold;
- the step of communicating to the user that the measured weight has exceeded the second predetermined threshold includes activating an exterior sounder and an exterior lamp of the vehicle; and
- the method includes the steps of determining the load is above a third predetermined threshold, wherein the third predetermined threshold is a rated weight capacity of the closure panel; and contacting a repair service provider as a result of the load exceeding the third predetermined threshold.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
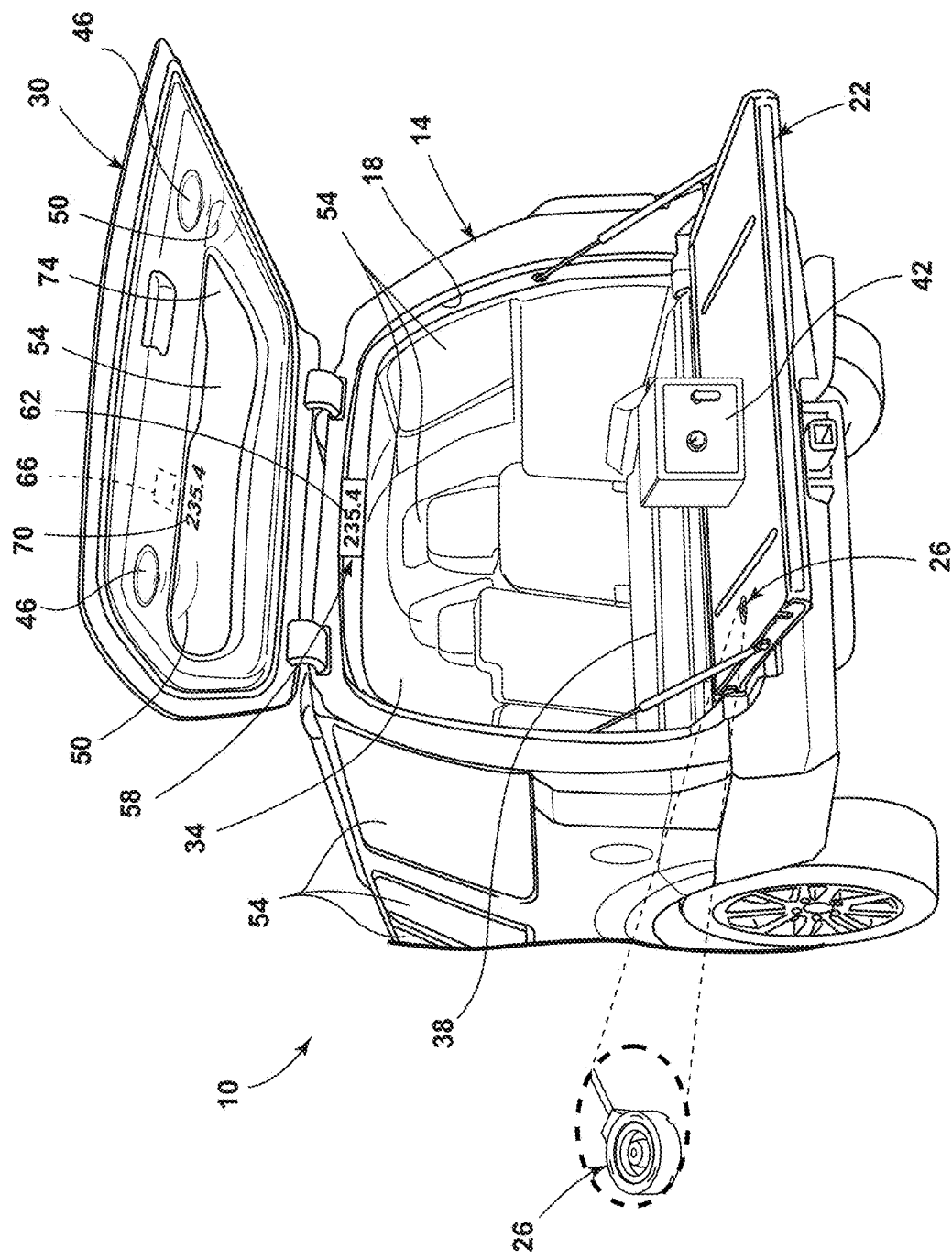
FIG. 1 is a rear perspective view of a vehicle, illustrating a first closure panel and a second closure panel each in an open position, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a load-sensing closure panel. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-4, reference numeral 10 generally designates a vehicle. In various examples, the vehicle 10 may be a motor vehicle. For example, the vehicle 10 may be a land-based vehicle (e.g., an automobile, a motorcycle, a train, etc.), an air-based vehicle (e.g., an airplane, a helicopter, etc.), and/or a water-based vehicle (e.g., a boat or other watercraft). While the vehicle 10 may be a motor vehicle, the present disclosure is not limited to internal combustion engines as a source of locomotive power for the vehicle 10. Rather, alternative sources may be utilized in providing locomotive power to the vehicle 10. For example, locomotive power may be provided to the vehicle 10 by electric motors, fuel cells, and/or petroleum-based fuel engines. According to various examples, the vehicle 10 may be driver-controlled, semi-autonomous, fully-autonomous, or any combination of user-controlled and automated. For example, the semi-autonomous example of the vehicle 10 may perform many or all-commuting functions (e.g., accelerating, braking, turning, signaling, etc.) independent of user interaction while the user maintains override control of the vehicle 10. The vehicle 10 includes a body 14. The body 14 defines an aperture 18. The vehicle 10 also includes a first closure panel 22 that is movable between an open position and a closed position. The first closure panel 22 can cover at least a portion of the aperture 18 when the first closure panel 22 is in the closed position. A load sensor 26 is coupled to the first closure panel 22. The load sensor 26 senses a load that is applied to the first closure panel 22.

Referring again to FIGS. 1-3, the vehicle 10 can include a second closure panel 30 that is movable between an open position and a closed position (see FIGS. 1 and 2). Similar to the first closure panel 22, the second closure panel 30 can cover at least a portion of the aperture 18 when the second closure panel 30 is in the closed position. In some examples, when the first and second closure panels 22, 30 are both in the closed position, an entirety of the aperture 18 of the vehicle 10 can be covered. For example, the first closure panel 22 can be referred to as a lower liftgate and the second closure panel 30 can be referred to as an upper liftgate of a split-liftgate system (see FIG. 1). In another example, the first closure panel 22 can be referred to as a front tailgate and the second closure panel 30 can be referred to as a hood of the vehicle 10 (see FIG. 3). In various examples, such as that depicted in FIG. 2, the aperture 18 of the vehicle 10 may be entirely covered when the first closure panel 22 is placed in the closed position. It is contemplated that the second closure panel 30 may be a cover for a pickup truck bed such that the example depicted in FIG. 2 may include the second closure panel 30 in a manner similar to that depicted in FIG. 3. In some examples, the aperture 18 may provide access to a passenger compartment 34 of the vehicle 10 (see FIG. 1). Additionally, or alternatively, the aperture 18 may provide access to a cargo area 38 of the vehicle 10. In some examples, the first closure panel 22 may be referred to as a tailgate or as a lower liftgate. In various examples, the second closure panel 30 may be referred to as an upper liftgate, a hood, or a truck bed cover. In examples that employ the first closure panel 22 and the second closure panel 30, the first and second closure panels 22, 30 can be dimensioned in a variety of ways without departing from the concepts disclosed herein. For example, the first and second closure panels 22, 30 may each cover about 50% of the aperture 18 such that the entirety of the aperture 18 is covered when the first and second closure panels 22, 30 are each in the closed position. Accordingly, in such an example, the first closure panel 22 may cover the lower half of the aperture 18 while the second closure panel 30 covers an upper half of the aperture 18. However, the present disclosure is not so limited. Rather, the first and second closure panels 22, 30 may be sized and/or dimensioned in any manner that provides a covering of the entirety of the aperture 18. For example, expressing the coverage of the first and second closure panels 22, 30 of the aperture 18 as a ratio of first closure panel 22 coverage to second closure panel 30 coverage (first closure panel coverage:second closure panel coverage), the first closure panel 22 and the second closure panel 30 may have a ratio split of the aperture 18 of about 5:95, about 10:90, about 15:85, about 20:80, about 25:75, about 30:70, about 35:65, about 40:60, about 45:55, about 50:50, about 55:45, about 60:40, about 65:35, about 70:30, and so on without departing from the concepts disclosed herein. Indeed, the first closure panel 22 may be sized and/or dimensioned to independently cover an entirety of the aperture to the exclusion of the second closure panel 30 (see FIG. 2). In various examples, the first closure panel 22 can cover a portion of the aperture 18 that extends primarily along a first plane (e.g., vertical) while the second closure panel 30 can cover a portion of the aperture 18 that extends primarily along a second plane (e.g., horizontal), such as that depicted in FIG. 3.

Figure 2:
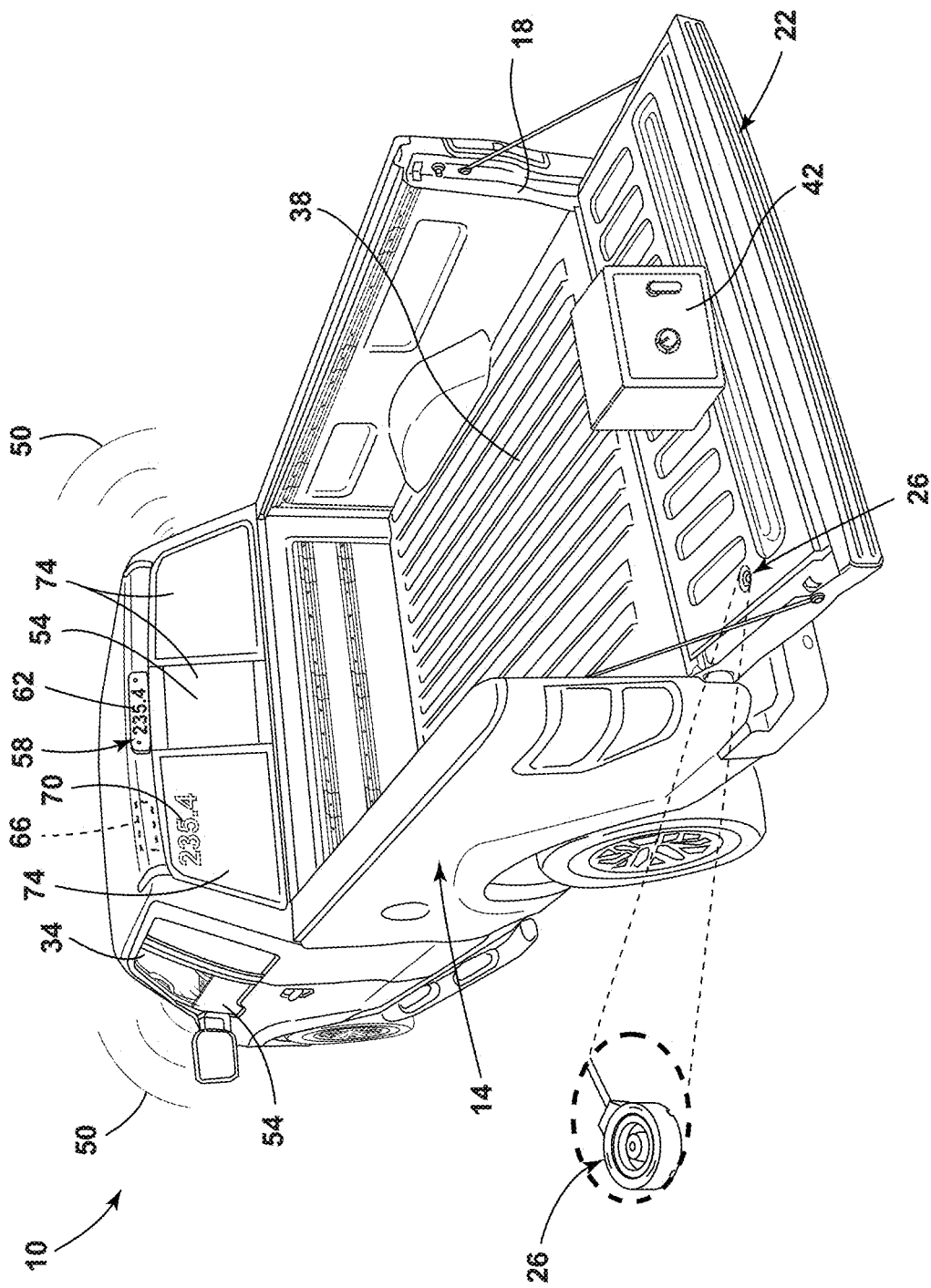
FIG. 2 is a rear perspective view of the vehicle, illustrating the first closure panel in the open position, according to another example.
Figure 3:
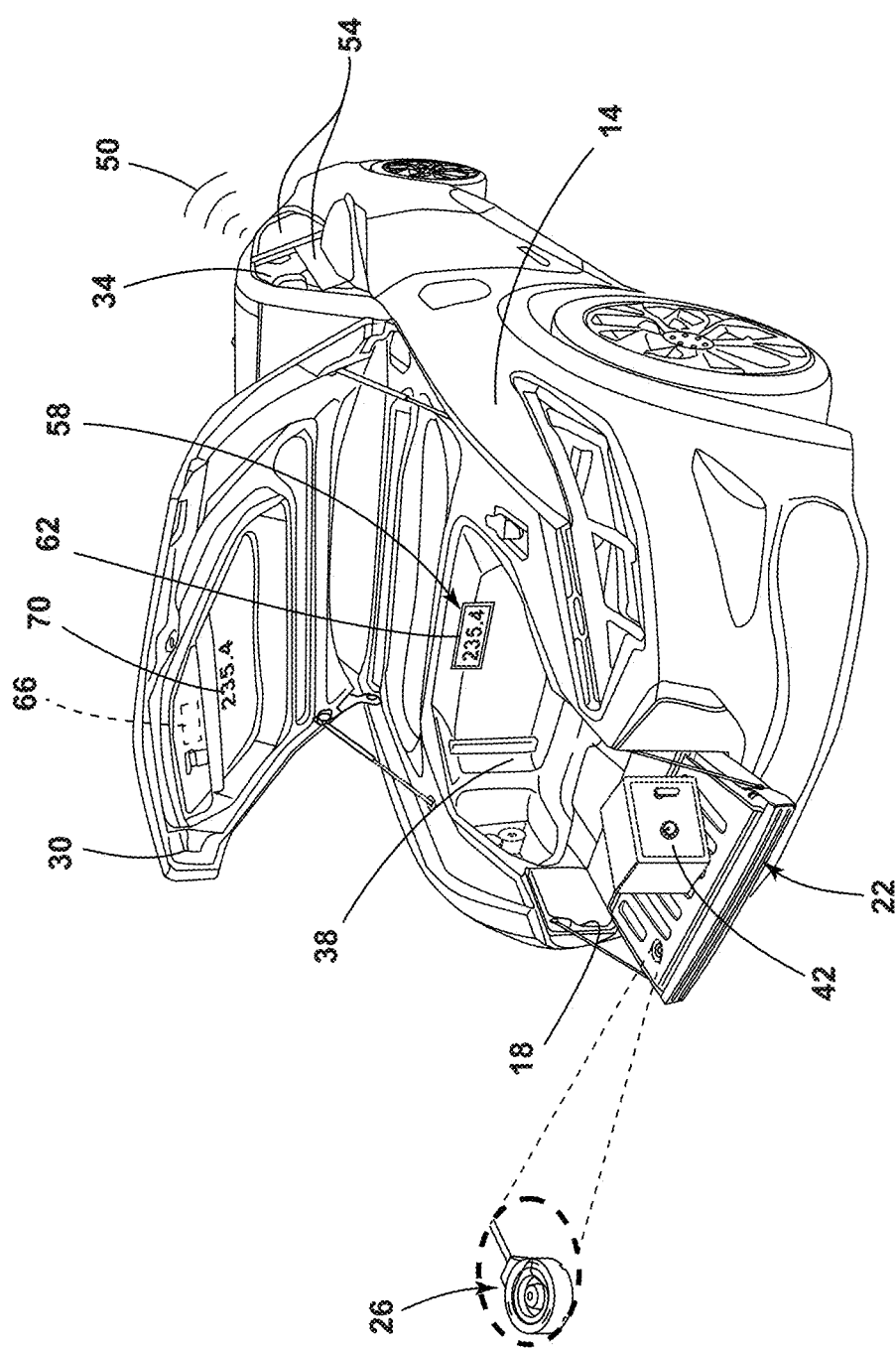
FIG. 3 is a front perspective of the vehicle, illustrating the first closure panel and the second closure panel in the open position, according to one example.

Referring further to FIGS. 1-3, as stated above, the load sensor 26 is coupled to the first closure panel 22. The coupling of the load sensor 26 to the first closure panel 22 may take many forms. For example, the load sensor 26 may be positioned within the first closure panel 22, as depicted in FIGS. 1-3. Alternatively, the load sensor 26 may be positioned within a hinge that couples the first closure panel 22 to the body 14 of the vehicle 10. It is contemplated that the load sensor 26 may be positioned in any suitable location that allows or enables the load sensor 26 to register a load experienced by the first closure panel 22. In general, the load sensor 26 converts a force (e.g., tension, compression, pressure, torque, etc.) into an electrical signal that can be measured. As the force applied to the load sensor 26 increases, the electrical signal that is output by the load sensor 26 changes in a proportional manner (e.g., increases or decreases). The signal output by the load sensor 26 may be directed to a controller of the vehicle 10, as will be discussed further herein. Non-limiting examples of the load sensor 26 can include load cells, force cells, load transducers, force transducers, and the like. It is contemplated that the load sensor 26 may be coupled to the first closure panel 22 by way of a linkage assembly, where the linkage assembly transmits force applied to the first closure panel 22 to the load sensor 26, which may enable an indirect coupling between the first closure panel 22 and the load sensor 26 as opposed to a direct coupling.

Referring still further to FIGS. 1-3, the force that is sensed by the load sensor 26 may be provided by a cargo item 42 that has come into contact with the first closure panel 22. The present disclosure provides a variety of ways of communicating a load or force that is sensed by the load sensor 26 to a user. Accordingly, the user may be informed of the weight or load of the cargo item 42 such that the user may utilize the first closure panel 22 as a scale and/or the user may be kept informed with regard to a health of the first closure panel 22. When referring to a health of the first closure panel 22, the present disclosure may be referencing a proximity of the force or load sensed by the load sensor 26 to a rated load or weight capacity of the first closure panel 22. For example, the first closure panel 22 can withstand a certain weight, load, and/or force prior to experiencing a degree of damage to the first closure panel 22 and/or structures that couple the first closure panel 22 to the body 14 of the vehicle 10. Accordingly, the load sensor 26 may be employed to prevent damage to the first closure panel 22 and/or the vehicle 10 in general by enabling the vehicle 10 to inform the user when the first closure panel 22 is experiencing a weight, load, and/or force that approaches or exceeds the rated load or weight capacity of the first closure panel 22. Rather than displaying a measured weight, the load sensor 26 can be used to display a percentage of the rated load or weight capacity that has been consumed or reached as a result of the weight of the cargo item 42. While the present disclosure references a weight or load experienced by the first closure panel 22 as a result of the cargo item 42, the present disclosure is not limited to sensing a load applied to the first closure panel 22 solely by the cargo item 42. Rather, the weight or load experienced by the first closure panel 22 and measured by the load sensor 26 may originate from a variety of sources (e.g., individuals applying at least a portion of their weight to the opened first closure panel 22) without departing from the concepts disclosed herein.

Referring again to FIGS. 1-3, the vehicle 10 can include one or more speakers 46. The speakers 46 may be positioned and/or oriented to provide audio output 50 to the passenger compartment 34 of the vehicle 10. For example, as depicted in FIG. 1, the second closure panel 30 may be provided with one or more of the speakers 46. In such an example, regardless of whether the second closure panel 30 is in the open position or the closed position, the load sensed by the load sensor 26 may be communicated to the user as the audio output 50 of the speaker 46. The audio output 50 from at least one of the speakers 46 may read out the measured weight of the cargo item 42 and/or provide a notification to the user regarding a proximity of the measured weight to the rated weight capacity of the first closure panel 22. In examples where the second closure panel 30 is omitted and/or the aperture 18 provides access to the cargo area 38 but not the passenger compartment 34, such as that depicted in FIGS. 2 and 3, one or more windows 54 may be placed in an at least partially opened position by the vehicle 10 (e.g., by executing routines within a memory of the controller 78) prior to communication of the audio output 50 such that a user that is external to the vehicle 10 may be provided with a greater opportunity of hearing the audio output 50 from at least one of the speakers 46. In some examples, a display device 58 may be positioned within a portion of the body 14. In such examples, the load sensed by the load sensor 26 can be communicated to the user as a numerical output 62 of the display device 58. In various examples, the display device 58 may be positioned within the upper region of the body 14. It is contemplated that the display device 58 may serve more than one purpose. For example, the display device 58 may be utilized as a brake light, such as a third brake light, while also being utilized as the display device 58 for the numerical output 62 relating to the load sensed by the load sensor 26.

Referring further to FIGS. 1-3, the second closure panel 30 and/or a portion of the body 14 may be provided with a projection-based display device 66. In examples that employ the second closure panel 30, such as that depicted in FIG. 1, the projection-based display device 66 may be housed within the second closure panel 30. In such an example, the projection-based display device 66 may project a numerical output 70 onto a portion of the second closure panel 30. For example, the second closure panel 30 may be provided with one of the windows 54, such as a rear window 74, and the numerical output 70 of the projection-based display device 66 may be projected upon the window 54 of the second closure panel 30. In examples that do not employ the second closure panel 30, such as that depicted in FIG. 2, the projection-based display device 66 may project the numerical output 70 upon one of the windows 54 that is visible from the location of the first closure panel 22. For example, the numerical output 70 from the projection-based display device 66 may be projected upon one of the rear windows 74 that faces or is immediately adjacent to the cargo area 38. Regardless of the surface upon which the numerical output 70 is projected from the projection-based display device 66, the load sensed by the load sensor 26 can be communicated to the user as the numerical output 70 of the projection-based display device 66. The vehicle 10 can include a controller 78 (see FIG. 3). As the measured weight, load, and/or force that is sensed by the load sensor 26 approaches a predetermined threshold, the controller 78 can communicate a notification to the user that the load sensed by the load sensor 26 is approaching the predetermined threshold, as will be discussed further herein. The notification can be communicated (e.g., audibly and/or visually) in the same language that is selected as the default language within a system of the vehicle 10 (e.g., the controller 78). For example, the default language may be set within an infotainment system of the vehicle 10 and the notification may be communicated using the default language. It is contemplated that the notification may be communicated in a series of languages and may begin with the default language. For example, the notification can be communicated in English, then Spanish, then French, then German, then Arabic, then Chinese, then Japanese, and so on.

Referring still further to FIGS. 1-3, in some examples, the notification may be sent to an owner of the vehicle 10 and/or a warranty service provider via an over-the-air transmission (e.g., a cloud transmission or a telematics transmission). In so doing, an administrator or the owner may receive the notification by way of electronic mail (email), text message, push notification, display message upon a mobile device, etc. The notification can include various information such as date, time, location, measured load, and/or level of load versus the rated load or weight capacity of the first closure panel 22. It is contemplated that the user of the vehicle 10 may be different than the owner of the vehicle 10 (e.g., a family member of the owner, an employee of the owner, a friend of the owner, etc.). Accordingly, the owner may be kept informed as to the status or health of the first closure panel 22. It is also contemplated that, by notifying a warranty service provider (e.g., a dealership, a manufacturer, etc.), warranty repair costs may be avoided in instances of user neglect or misuse. For example, the vehicle 10 may log or otherwise store notification events (e.g., within memory on-board the vehicle 10 or within a cloud-based memory system). The notification events can be stored any time a predetermined threshold was exceeded and/or any time the rated weight capacity was exceeded. Information or data stored as a result of the notification event can include, but is not limited to, date, time, GPS location, level of measure load or weight versus rated weight capacity, images from cameras on-board the vehicle 10 (e.g., exterior and/or interior), and/or mobile device identification information for mobile devices within the vicinity.

Figure 4:
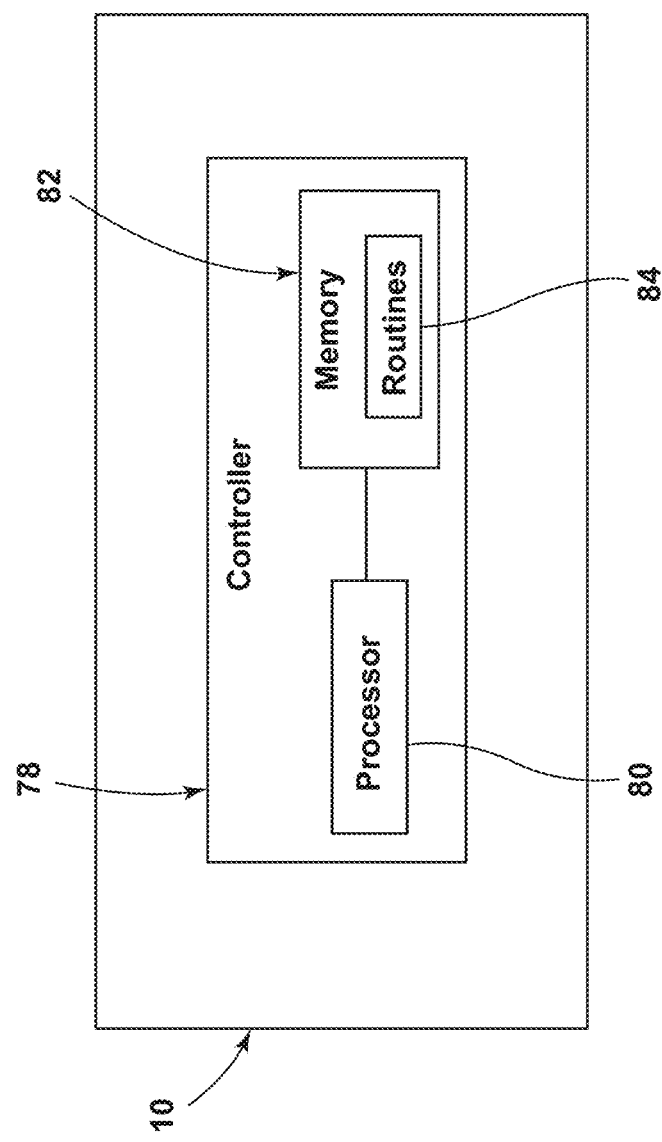
FIG. 4 is a schematic representation of the vehicle, illustrating a controller arrangement, according to one example.

Referring now to FIG. 4, the vehicle 10 includes the controller 78. The controller 78 includes a processor 80 and memory 82. The memory 82 stores software routines 84 that are executable by the processor 80. In various situations, some of which will be discussed further herein, the software routines 84 within the memory 82 may be accessed by the controller 78 and/or the processor 80 in response to an input from the vehicle 10 (e.g., the load sensor 26). For example, in response to an input from the load sensor 26, the processor 80 may access the software routines 84 stored within the memory 82 to compare the input from the load sensor 26 against one or more predetermined threshold. In the event that the input from the load sensor 26 corresponds to a value that exceeds one or more of the predetermined thresholds, the processor 80 may access the software routines 84 to communicate such exceeding of the predetermined threshold(s) to the user.

Figure 5:
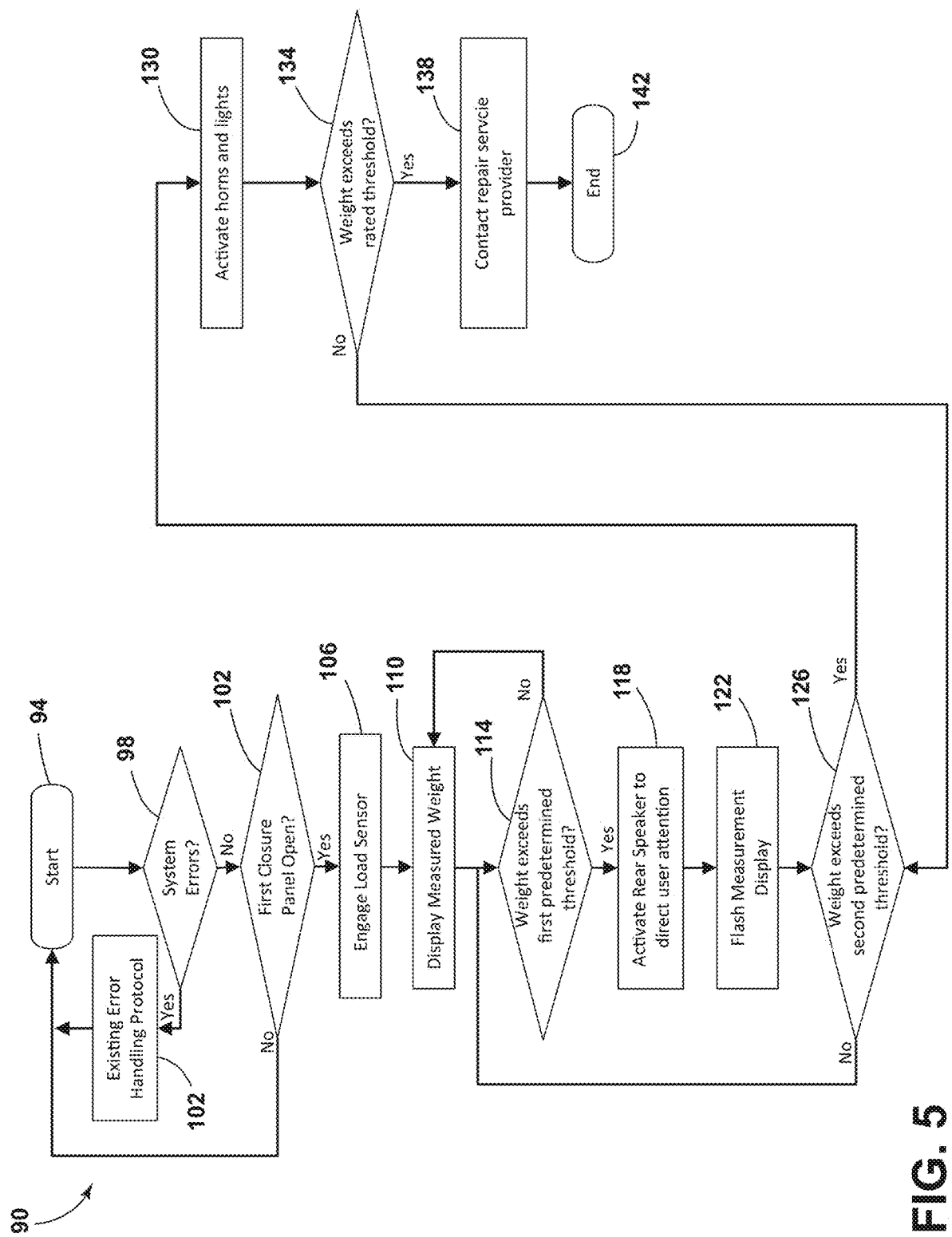
FIG. 5 is a flow diagram illustrating a method of evaluating a load exposure of a closure panel of the vehicle, according to one example.

Referring to FIG. 5, a flow diagram depicting a method 90 of evaluating a load exposure of a closure panel, such as the first closure panel 22, of the vehicle 10 is shown according to one example. The method 90 begins at starting point 94. Once the method 90 has been started or initiated at starting point 94, the method 90 can determine whether any system errors exist at decision point 98. If decision point 98 determines that system errors do exist, then the method 90 may execute step 102 of entering into an existing error handling protocol. The existing error handling protocol can include diagnosing the existing error, communicating the existing error to the vehicle 10, communicating the existing error to the user, and/or resolving the existing error. If the method 90 determines at decision point 98 that no system errors exist that would prevent the execution of the remainder of the method 90, then the method 90 may advance to decision point 102 of determining whether the first closure panel 22 is in the open position. If at decision point 102 the method 90 determines that the first closure panel is not in the open position, then the method 90 may return to the starting point 94. However, if the method 90 determines at decision point 102 that the first closure panel 22 is in the open position, then the method 90 may advance to step 106 of engaging the load sensor 26. Once the load sensor 26 has been engaged at step 106, the method 90 may advance to step 110 of displaying a measured weight. Said another way, step 110 may display a load exposure of the first closure panel 22. Step 110 of displaying the measured weight or load exposure of the first closure panel 22, as measured by the load sensor 26, may be accomplished by any of the approaches outlined above with regard to communicating to the user a weight of the cargo item 42. Step 110 of displaying the measured weight or load exposure of the first closure panel 22 can include displaying the measured weight of the cargo item 42 (e.g., in pounds or kilograms) and/or displaying a percentage of the rated weight capacity that has been consumed or reached.

Referring again to FIG. 5, the controller 78 may have access to the rated weight or load capacity of the first closure panel 22 (e.g., within the memory 82). The controller 78 may execute the method 90 as one of the software routines 84 stored within the memory 82. Accordingly, the controller 78 may process an electrical output of the load sensor 26 (e.g., by way of the processor 80) and compare the measured load or weight provided by the load sensor 26 against the rated load or weight capacity of the first closure panel 22. Therefore, the method 90 may determine at decision point 114 whether the measured weight has exceeded a first predetermined threshold. In various examples, the first predetermined threshold may represent a percentage of the rated weight or load capacity of the first closure panel 22 or the first predetermined threshold may represent being within a certain weight of the rated weight or load capacity. For example, the first predetermined threshold may be set at a weight that is within 50 lbs. (22.7 kg) of the rated load or weight capacity. If at decision point 114 the method 90 determines that the measured weight does not exceed the first predetermined threshold, then the method 90 may return to the step 110 of displaying the measured weight. However, if at decision point 114 method 90 determines that the measured weight exceeds the first predetermined threshold, then such exceeding of the first predetermined threshold may be communicated to the user. For example, the communicating of the measured weight having exceeded the first predetermined threshold can include step 118 of activating one or more of the speakers 46 to supply the audio output 50 that communicates to the user that the first predetermined threshold has been exceeded. The audio output 50 from the speaker 46 communicating the exceeding of the first predetermined threshold to the user can include a notification statement with regard to potential damage to the first closure panel 22, an audible reading of the load measured by the load sensor 26, an audible reading of the rated weight capacity of the first closure panel 22, and/or an audible reading of a remaining weight or load that the first closure panel 22 can handle prior to reaching the rated weight capacity of the first closure panel 22. Additionally, or alternatively, step 122 of flashing the measurement display (e.g., numerical output 62 or numerical output 70) may be executed in communicating to the user that the measured weight has exceeded the first predetermined threshold. In general, upon exceeding the first predetermined threshold, the method 90 seeks to make the user aware that they are approaching a load upon the first closure panel 22 that may result in damage to the first closure panel 22 and/or other components of the vehicle 10.

Referring further to FIG. 5, as the load sensor 26 continues to monitor the weight or load experienced by the first closure panel 22, the method 90 can reach decision point 126 of determining whether the weight or load experienced by the first closure panel 22 exceeds a second predetermined threshold. If at decision point 126 the method 90 determines that the second predetermined threshold has not been exceeded, then the method 90 can continue to display the measured weight and/or communicate the notifications related to the exceeding of the first predetermined threshold to the user. However, if the method 90 determines at decision point 126 that the second predetermined threshold has been exceeded, then the method 90 can communicate to the user that the measured weight or load experienced by the load sensor 26 has exceeded the second predetermined threshold. In various examples, the second predetermined threshold may represent a larger percentage of the related weight capacity of the first closure panel 22 or a certain weight less than the rated weight capacity of the first closure panel 22. For example, the second predetermined threshold may be 10 lbs. (4.5 kg) less than the rated weight capacity of the first closure panel 22. Upon the determination that the measured weight has exceeded the second predetermined threshold at decision point 126, the method 90 can communicate such exceeding of the second predetermined threshold in a more urgent manner than that which was communicated at the exceeding of the first predetermined threshold. For example, at step 130 the method 90 may activate an exterior sounder and exterior lamp of the vehicle 10. Accordingly, the user may be more likely to cease the activity in which they are engaging that is resulting in the load or weight being applied to the first closure panel 22 and seek to determine a cause for the activating of the exterior sounder and the exterior lamp of the vehicle 10. Examples of the exterior sounder can include, but are not limited to, an exterior speaker of the vehicle 10, a horn of the vehicle 10, and/or other sound-producing arrangements of the vehicle 10. Alternative sound-producing arrangements of the vehicle 10 can include coupling a transducer to a component of the vehicle 10 (e.g., glass of one of the windows 54 and/or sheet metal of the body 14) such that the component of the vehicle 10 acts as a diaphragm of a speaker. Examples of the exterior lamp include, but are not limited to, a front-facing light (e.g., headlight) of the vehicle 10, a rear-facing light (e.g., taillight) of the vehicle 10, and/or a side-facing light of the vehicle 10. Additionally, or alternatively, the method 90 may employ the speakers 46 to provide the audio output 50 communicating to the user that the second predetermined threshold has been exceeded and/or continuing to flash the measurement display by alternating the numerical output 62 and/or the numerical output 70 between an on state and an off state repeatedly. As the load sensor 26 continues to monitor the load or weight applied to the first closure panel 22, the method 90 may reach decision point 134 of determining whether the weight exceeds the rated weight capacity or threshold. If at decision point 134 the method 90 determines that the rated weight capacity or threshold has not been exceeded, then the method 90 may continue to warn, notify, or otherwise communicate to the user that the second predetermined threshold has been exceeded. However, if the load or weight measured by the load sensor 26 is determined to exceed the rated weight capacity or threshold at decision point 134, then the method 90 may advance to step 138 of contacting a repair service provider. In contacting the repair service provider at step 138, the method 90 may provide additional information to the repair service provider, such as a GPS location of the vehicle 10, customer contact information, vehicle-specific information, and the like, such that the repair service provider may evaluate, diagnose, and/or resolve any damage or issues that may result from having exceeded the rated weight capacity of the first closure panel 22. The method 90 can cease at endpoint 142.

Figure 6:
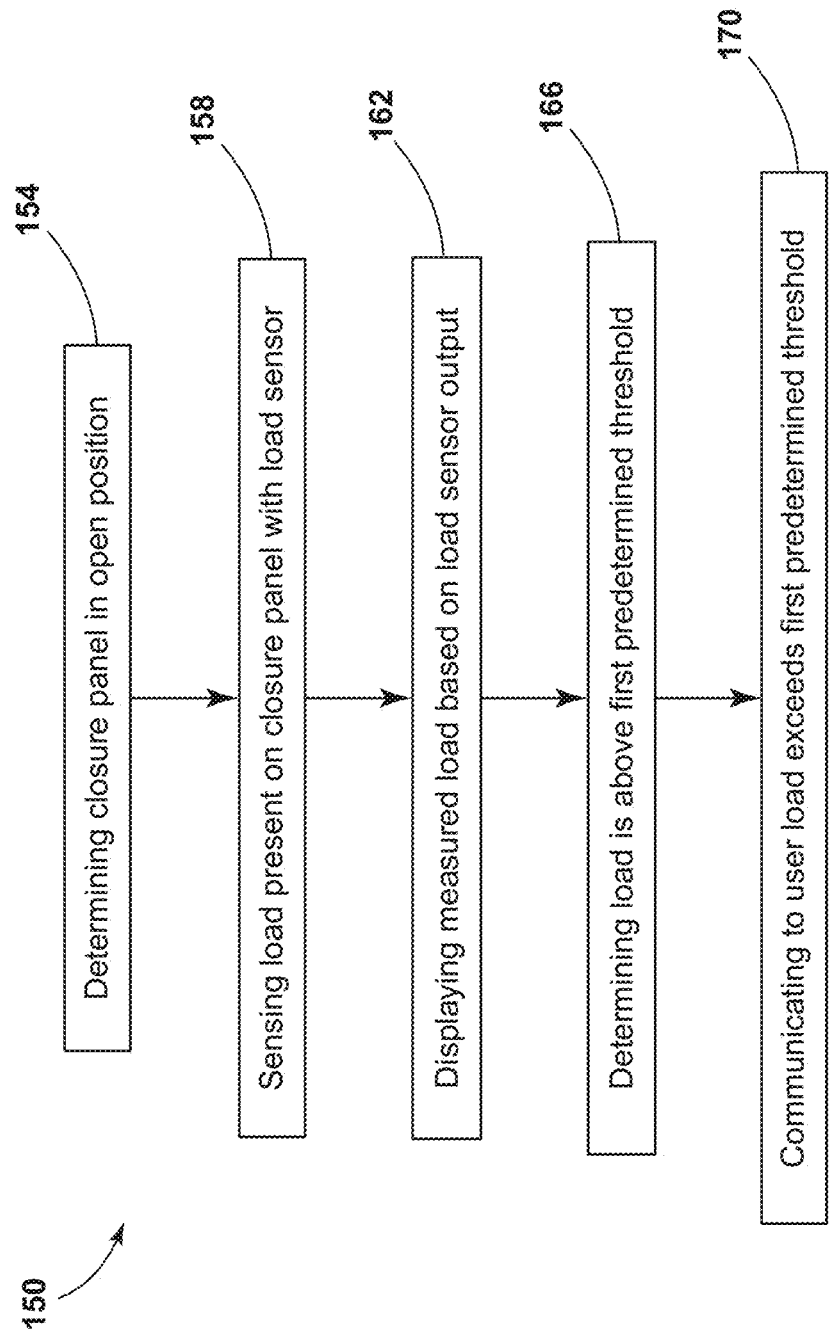
FIG. 6 is a flow diagram illustrating the method of evaluating the load exposure of the closure panel of the vehicle, according to another example.

Referring now to FIG. 6, a flow chart of a method 150 of evaluating a load exposure of a closure panel (e.g., the first closure panel 22) of the vehicle 10 is shown according to one example. The method 150 includes step 154 of determining the closure panel, such as the first closure panel 22, is in an open position. The open position may be alternatively referred to as a deployed position, a lowered position, a down position, and the like. The method 150 also includes step 158 of sensing a load is present on the closure panel with the load sensor 26. Upon sensing the load is present on the closure panel at step 158, the method 150 can perform step 162 of displaying a measured load or weight based on an output of the load sensor 26. For example, the load sensor 26 may provide an output to the controller 78. The controller 78 can determine the load or weight based upon the output from the load sensor 26 (e.g., by employing the processor 80, the memory 82, and/or the software routines 84). Once the load or weight has been determined based upon the output from the load sensor 26 at step 162, the method 150 can perform step 166 of determining the load or weight is above a first predetermined threshold. For example, the controller 78 may have the first predetermined threshold stored within the memory 82. Accordingly, the processor 80 may compare the measured weight or load to the stored first predetermined threshold. Upon determining that the measured load or weight is above the first predetermined threshold at step 166, the method 150 can perform step 170 of communicating to the user that the measured load or weight has exceeded the first predetermined threshold.

Referring again to FIG. 6, the step 170 of communicating to the user that the measured load or weight has exceeded the first predetermined threshold can employ any of the examples of communicating with the user outlined above individually or in any combination. For example, the step 170 of communicating to the user that the measured load or weight has exceeded the first predetermined threshold can include activating one or more of the speakers 46 of the vehicle 10 such that the one or more of the speakers 46 emits the audio output 50. Additionally, or alternatively, the step 170 of communicating to the user that the measured load or weight has exceeded the first predetermined threshold can include alternating the displayed measured load or weight (e.g., the numerical output 62 and/or the numerical output 70) between an on state and an off state such that the displayed measured load or weight flashes a plurality of times. In various examples, the method 150 can include a step of determining the load is above a second predetermined threshold by referencing the output of the load sensor 26. In such an example, the method 150 can also include a step of communicating to the user that the measured load or weight has exceeded the second predetermined threshold. The second predetermined threshold can be greater than the first predetermined threshold. That is, the second predetermined threshold can be a greater percentage of the rated load or weight capacity (e.g., closer to the rated load or weight capacity). In some examples, the step of communicating to the user that the measured load or weight has exceeded the second predetermined threshold can be performed in a manner that expresses a greater degree of urgency to the user. For example, the step of communicating to the user that the measured load or weight has exceeded the second predetermined threshold can include activating an exterior sounder and an exterior lamp of the vehicle 10 (e.g., alternating between an on state and an off state a plurality of times). In various examples, the method 150 can include a step of determining that the load or weight is above a third predetermined threshold. The third predetermined threshold can be the rated load or weight capacity of the closure panel (e.g., the first closure panel 22). In such an example, the method 150 can include a step of contacting a repair service provider (e.g., a vehicle dealership) as a result of the load exceeding the third predetermined threshold. Additionally, or alternatively, the user may be informed of the load exceeding the third predetermined threshold by audio and/or visual communications provided by the vehicle 10. For example, the vehicle 10 may provide a message to the user regarding the load or weight capacity of the closure panel having been exceeded and/or that damage may have occurred to the closure panel in the form of the audio output 50 from one or more of the speakers 46.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle, comprising:
   a body;
   an aperture defined by the body;
   a first closure panel coupled to the body via a hinge and movable between an open position and a closed position, wherein the first closure panel covers at least a portion of the aperture when the first closure panel is in the closed position; and a load sensor positioned within the hinge and coupled to the first closure panel, wherein the load sensor senses a load that is applied to the first closure panel.

2. The vehicle of claim 1, further comprising:
a speaker, wherein the load sensed by the load sensor is communicated to a user as an audio output from the speaker.

3. The vehicle of claim 1, further comprising:
a display device positioned within a portion of the body, wherein the load sensed by the load sensor is communicated to a user as a numerical output of the display device.

4. The vehicle of claim 1, further comprising:
a second closure panel that is movable between an open position and a closed position, wherein the second closure panel covers at least a portion of the aperture when the second closure panel is in the closed position.

5. A vehicle, comprising:
a body;
an aperture defined by the body;
a first closure panel that is movable between an open position and a closed position, wherein the first closure panel covers at least a portion of the aperture when the first closure panel is in the closed position;
a load sensor coupled to the first closure panel, wherein the load sensor senses a load that is applied to the first closure panel; and
a second closure panel that is movable between an open position and a closed position, wherein the second closure and covers at least a portion of the aperture when the second closure panel is in the closed position, and wherein the second closure panel comprises a projection-based display device, and wherein the load sensed by the load sensor is communicated to a user as a numerical output of the projection-based display device.

6. The vehicle of claim 5, wherein the numerical output of the projection-based display device is projected onto a portion of the second closure panel.

7. The vehicle of claim 4, wherein the first closure panel and the second closure panel cover an entirety of the aperture when the first closure panel and the second closure panel are each in the closed position.

8. The vehicle of claim 1, further comprising:
a controller, wherein the controller communicates a notification to a user when the load sensed by the load sensor approaches a predetermined threshold.

9. The vehicle of claim 8, wherein the controller contacts a repair service provider when the load sensed by the load sensor exceeds the predetermined threshold.

10. The vehicle of claim 1, wherein the load sensor is positioned within the first closure panel.

11. The vehicle of claim 1, wherein the aperture provides access to a cargo area.

12. The vehicle of claim 1, wherein the aperture provides access to a passenger compartment.

13. The vehicle of claim 1, wherein the load sensed by the load sensor is communicated to a user in a default language, and wherein the default language is selected within an infotainment system.

14. The vehicle of claim 1, wherein the load sensed by the load sensor is communicated to a user via an over-the-air transmission.

15. A method of evaluating a load exposure of a closure panel that is coupled to a body via a hinge of a vehicle, the method comprising the steps of:
determining the closure panel is in an open position;
sensing a load is present on the closure panel with a load sensor;
displaying a measured weight based on an output of the load sensor that is positioned within the hinge;
determining the load is above a first predetermined threshold; and
communicating to a user that the measured weight has exceeded the first predetermined threshold.

16. The method of claim 15, wherein the step of communicating to a user that the measured weight has exceeded the first predetermined threshold comprises activating a speaker of the vehicle such that the speaker emits an audio output.

17. The method of claim 16, wherein the step of communicating to a user that the measured weight has exceeded the first predetermined threshold further comprises alternating the displayed measured weight between an on state and an off state such that the displayed measured weight flashes a plurality of times.

18. The method of claim 17, further comprising:
determining the load is above a second predetermined threshold; and
communicating to the user that the measured weight has exceeded the second predetermined threshold.

19. The method of claim 18, wherein the step of communicating to the user that the measured weight has exceeded the second predetermined threshold comprises activating an exterior sounder and an exterior lamp of the vehicle.

20. The method of claim 19, further comprising:
determining the load is above a third predetermined threshold, wherein the third predetermined threshold is a rated weight capacity of the closure panel; and
contacting a repair service provider as a result of the load exceeding the third predetermined threshold.

* * * * *

UNITED STATES PATENT AND TRADEMARK OFFICE
CERTIFICATE OF CORRECTION

| | | |
|---|---|---|
| PATENT NO. | : 11,906,348 B2 | Page 1 of 1 |
| APPLICATION NO. | : 17/158453 | |
| DATED | : February 20, 2024 | |
| INVENTOR(S) | : Salter et al. | |

It is certified that error appears in the above-identified patent and that said Letters Patent is hereby corrected as shown below:

In the Claims

Column 13:
Claim 15, Line 33;
"and" should be -- panel --.

Signed and Sealed this
Ninth Day of April, 2024

Katherine Kelly Vidal
*Director of the United States Patent and Trademark Office*